United States Patent [19]
Huang

[11] Patent Number: 5,193,246
[45] Date of Patent: Mar. 16, 1993

[54] AIR CUSHION GRIP WITH A CUBIC SUPPORTING STRUCTURE AND SHOCK-ABSORBING FUNCTION

[76] Inventor: Ing-Chung Huang, No. 15 Reh-Her 1st street, Kaohsiung City, Taiwan

[21] Appl. No.: 734,487

[22] Filed: Jul. 23, 1991

[51] Int. Cl.$^5$ .................... A47B 95/02; A47J 45/10
[52] U.S. Cl. ........................ 16/114 R; 16/116 R; 273/75; 273/81 R
[58] Field of Search ............. 16/111 R, 114 R, 116 R, 16/DIG. 12, DIG. 19; 273/75, 81 B, 81 D, 81 R, 81.4; 74/551.9

[56] References Cited

U.S. PATENT DOCUMENTS

| | | |
|---|---|---|
| 588,794 | 8/1897 | Grauger ........................ 16/DIG. 12 |
| 3,344,684 | 10/1967 | Steere, Jr. et al. ................ 273/81 R |
| 4,670,995 | 6/1987 | Huang . |
| 4,673,007 | 6/1987 | Huang . |
| 4,722,131 | 2/1988 | Huang . |
| 4,912,861 | 4/1990 | Huang . |
| 5,018,733 | 5/1991 | Buand ................................ 273/75 |

FOREIGN PATENT DOCUMENTS

| | | |
|---|---|---|
| 675170 | 4/1939 | Fed. Rep. of Germany ..... 74/551.9 |
| 2403172 | 5/1979 | France ................................. 273/75 |
| 977152 | 12/1982 | U.S.S.R. ............................ 16/11 R |

Primary Examiner—Robert L. Spruill
Assistant Examiner—Carmine Cuda
Attorney, Agent, or Firm—Bacon & Thomas

[57] ABSTRACT

An air cushion grip with a cubic structure and shock-absorbing function to be fixed around the handle of a tennis racket, a hammer, a bicycle or the like, and comprising an outer flat layer and a bottom layer provided with a plurality of round and/or straight grooves, the vertical walls of which form a plurality of air cells which may be either independent or communicating with one another. The air cells may be inflated or deflated with an air valve or pump attached to one of the air cells for adjusting the elasticity and shock-absorbing ability of the grip.

19 Claims, 13 Drawing Sheets

AIR CUSHION GRIP WITH A CUBIC SUPPORTING STRUCTURE AND SHOCK-ABSORBING FUNCTION

BACKGROUND OF THE INVENTION

At present grips for tennis rackets, badminton rackets, bicycle handles, motorcycle handles, steering wheels of cars, hammers, jackhammers, etc., can be classified into two kinds. One kind is an elastic solid grip made of rubber or plastic, and the other is a hollow-sectioned grip made of rubber or plastic. The former, the solid grips, have no more than the elasticity of their material for absorbing shocks, and are thus without any additional structural benefits. So their elasticity is definite, not adjustable for various practical uses. The latter have the elasticity of the material plus that provided by a plurality of the hollow sections formed therein. So they can save more material and have better elasticity than the former. In spite of that, they still have drawbacks in that the elasticity of the material is still constant and the elasticity provided by the hollow sections is not changeable.

Those kinds of conventional grips can hardly satisfy a variety of shock-absorbing functions for different objects or tools in practical use.

SUMMARY OF THE INVENTION

In view of the defects of conventional grips mentioned above, an air cushion grip with a cubic supporting structure and shock-absorbing function in the present invention has been devised to have the following effects and functions.

1. It has an original structural shock-absorbing elasticity of $P1V1=P2V2$, which represents the relationship between the cubic space and internal pressure, even if it is not inflated with air. Thus, the cubic space of an air cushion has a given constant pressure, whether or not inflated. When the cushion is depressed, the pressure is increased because of the reduced space. The pressure resumes its original value when the space resumes its original shape. Thus, the cubic or three-dimensional cushion provides elasticity when it is depressed.

2. It can be attached with an inflating means or a compressible pump to adjust the inner pressure to satisfy requirements of different users.

3. It has not only an ideal shock-absorbing elasticity but also a shock dispersive ability that is rarely seen in a conventional grip.

4. It can adapts to needs of different users, while lowering shock injury to a human body.

5. Its elasticity can be readily changed by a user, to get a proper feeling in holding it or a proper shock-avoiding effect, which is a breakthrough for a conventional grip with a definite unchangeable elasticity.

6. It provides a grooved surface and a flat surface which maintains shape to the utmost after it is inflated with air, so as to retain the original configuration and its smooth outer surface.

BRIEF DESCRIPTION OF THE DRAWINGS

FIG. 4 is perspective view of a tennis racket fixed with the first embodiment of an air cushion grip in the present invention.

FIG. 4-1 is a cross-sectional view of line 4-1—4-1 in FIG. 4.

FIG. 4-2 is a cross-sectional view of FIG. 4.

FIG. 4-3 is a cross-sectional view of FIG. 4, with a different fixing method on a grip of a racket from FIG. 4-2.

FIG. 13-1 is a cross-sectional view of line 13-1—13-1 in FIG. 13.

FIG. 14-1 is a cross-sectional view of line 14-1—14-1 in FIG. 14.

FIG. 15-1 is a cross-sectional view of line 15-1—15-1 in FIG. 15.

FIG. 16-1 is a cross-sectional view of line 16-1—16-1 in FIG. 16.

FIG. 19-1 is a cross-sectional view of line 19-1—19-1 in FIG. 19.

FIG. 19-2 is a cross-sectional view of the fourth embodiment of an air cushion grip wound in a round configuration.

FIG. 20-1 is an elevational view of the fifth embodiment of an air cushion grip shown in FIG. 20.

FIG. 21-1 is a cross-sectional view of line 21-1—21-1 in FIG. 21.

FIG. 21-2 is a cross-sectional view of the sixth embodiment of an air cushion grip wound round.

DETAILED DESCRIPTION OF THE INVENTION

Figure 1:
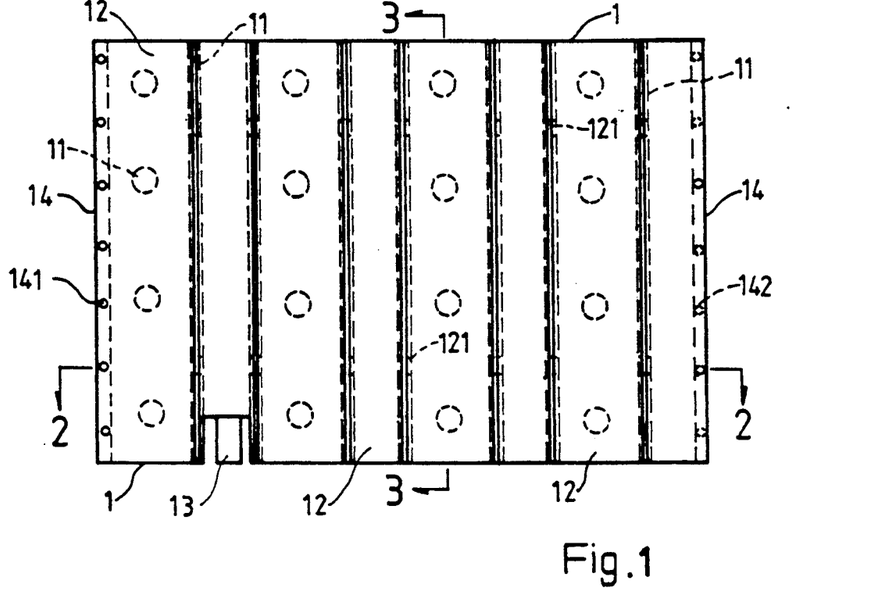
FIG. 1 is an elevational view of the first embodiment of an air cushion grip in the present invention.
Figure 2:
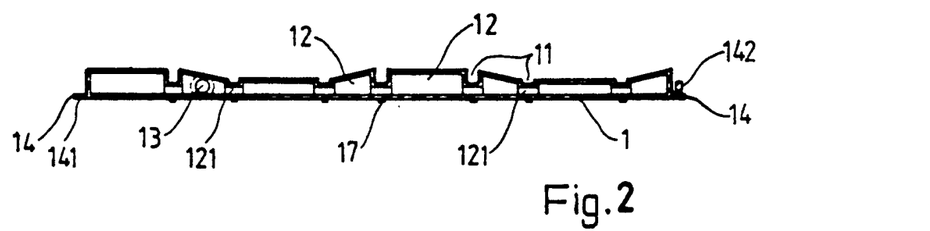
FIG. 2 is a cross-sectional view of line 2—2 in FIG. 1.
Figure 3:
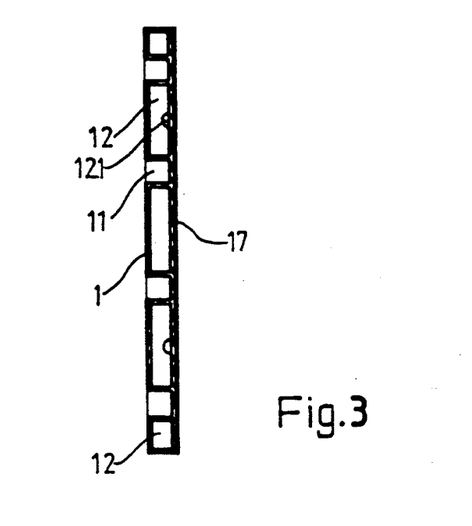
FIG. 3 is a cross-sectional view of line 3—3 in FIG. 1.

The first embodiment of an air cushion grip with a cubic supporting structure and shock-absorbing function in the present invention, as shown in FIG. 1, comprises an air cushion 1 consisting of an outer layer of flat surface and a bottom layer having a plurality of round and/or straight long grooves 11 to form a three dimensional surface which can be mixed with curved, sloped-up or sloped-down and flat portions.

Figures 4, 42, 43:
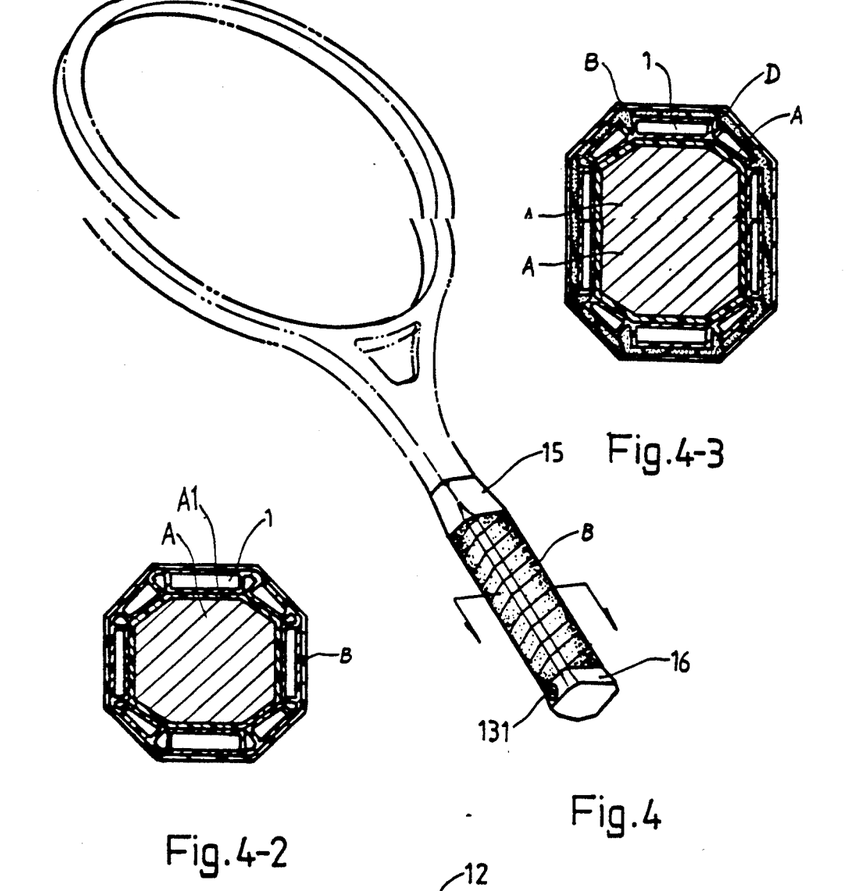

The vertical walls of straight grooves 11 form a plurality of cubic air cells 12 that are either independent or communicate with one another. If said cells 12 are not communicating with one another, they are independent and have a certain inner pressure. If said cells 12 are made to communicate with one another, passage tubes 121 of triangle, trapeziod, semi-circular, etc. are placed across the walls of straight grooves 11. A round hollow tube 13 can be attached to any of the communicating air cells 12 and a one-way valve 131, as seen in FIG. 4, can be connected with the outer end of the tube 13. The one-way valve 131 may be a rubber valve or an air valve used in a bicycle tire. Both side edges 14, right and left, are to be glued together, shaping this air cushion grip into a cylindrical configuration to fit around a handle of an object. The surface of the bottom layer and the height of the air cushion cells 12 can be such that the inner wall of the cross-section of the cylindrical grip can be circular, hexagonal, square, octagonal, etc., and the outer wall can be circular, square, hexagonal, octagonal, etc. so that this grip can be applied to handles or rackets or tools of any shape.

When the first embodiment of an air cushion grip in the present invention has been applied around a grip of a tennis racket, positioned between a flake 15 and a heel 16 as shown in FIGS. 4, 4-1, 4-2, 4-3, an outer enveloping layer B can be bound on the air cushion grip, and the one-way valve 131 is positioned to extend to the flake 15 or the heel 16 for inflating the air cushion grip, as show in FIG. 4-1. Or, as shown in FIG. 4-2, a layer of double-sided glue tape A1 is first wound around the grip of a racket, and then the air cushion grip and the outer enveloping layer B are thereafter bound thereto. One more way is, as shown in FIG. 4-3, that a PU or polyurethane foam layer D is at first bound on the air cushion grip and then the outer enveloping layer B is then bound on the foam layer D.

Figure 5:
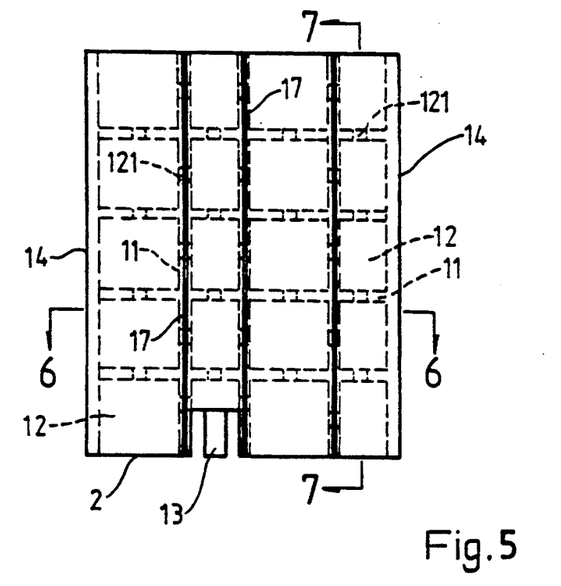
FIG. 5 is an elevational view of the second embodiment of an air cushion grip in the present invention.
Figure 6:
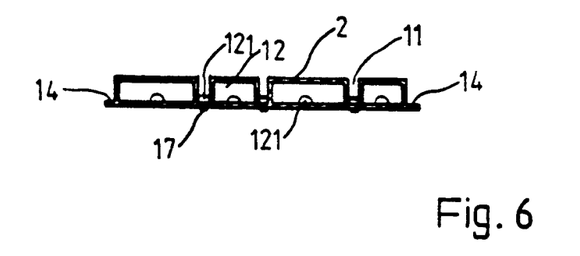
FIG. 6 is a cross-sectional view of line 6—6 in FIG. 5.
Figure 7:
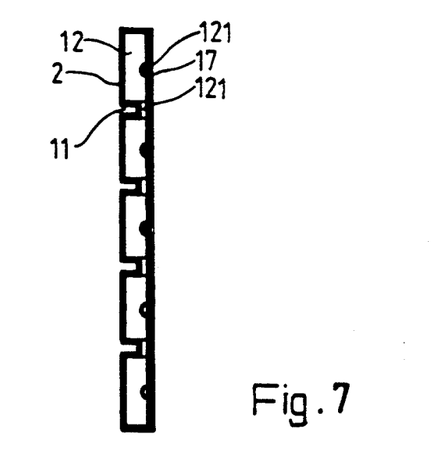
FIG. 7 is a cross-sectional view of line 7—7 in FIG. 5.
Figure 8:
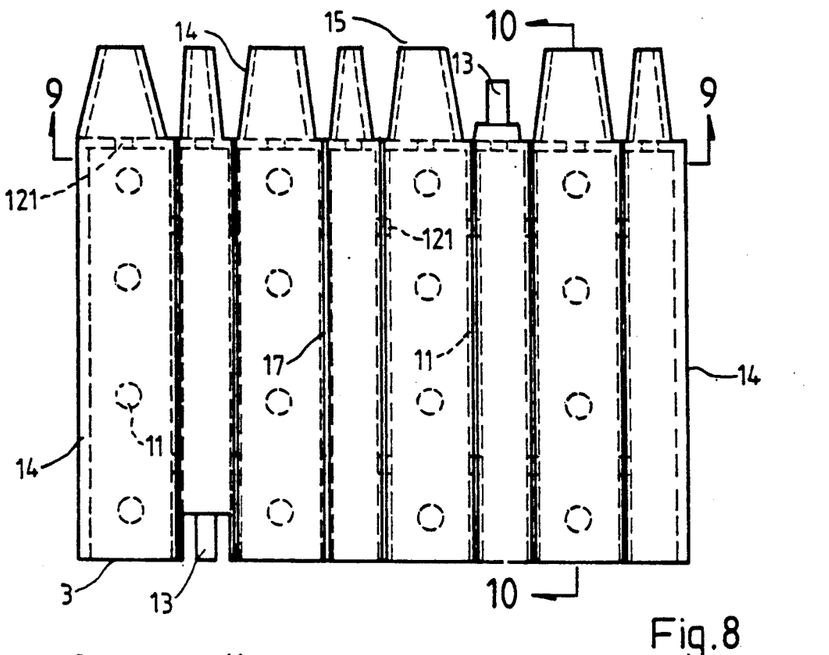
FIG. 8 is an elevational view of the third embodiment of an air cushion grip in the present invention.
Figure 9:
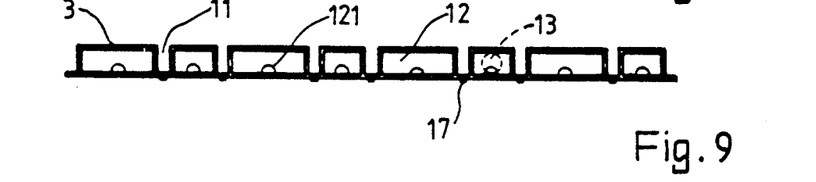
FIG. 9 is a cross-sectional view of line 9—9 in FIG. 8.
Figure 10:
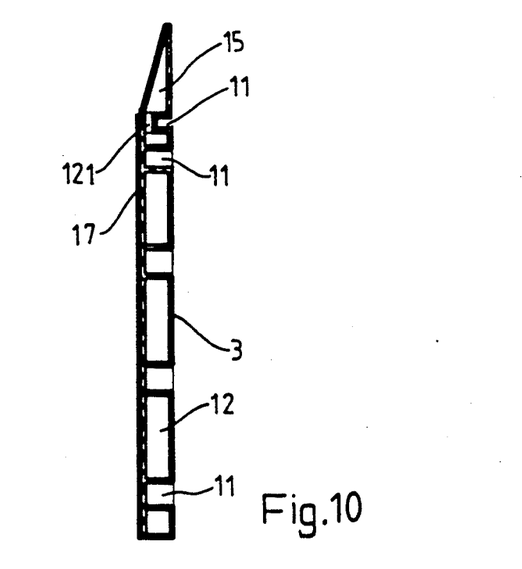
FIG. 10 is a cross-sectional view of line 10—10 in FIG. 8.
Figure 11:
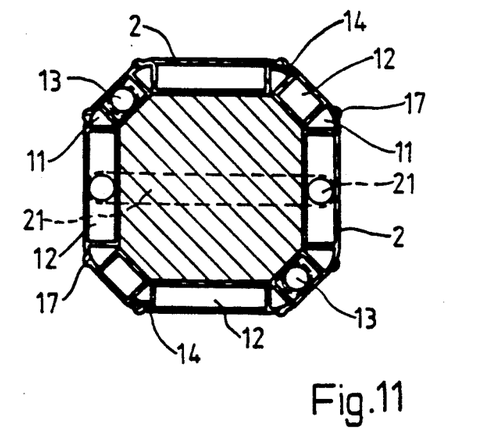
FIG. 11 is a cross-sectional view of the second embodiment of an air cushion grip applied to a grip of an object.
Figure 12:
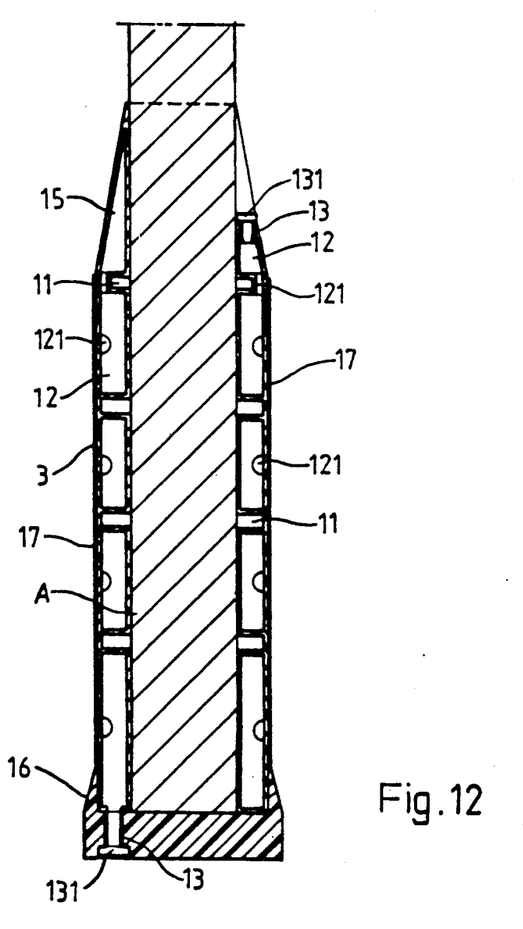
FIG. 12 is a cross-sectional view of the third embodiment of an air cushion grip applied to a grip of an object.
Figure 13:
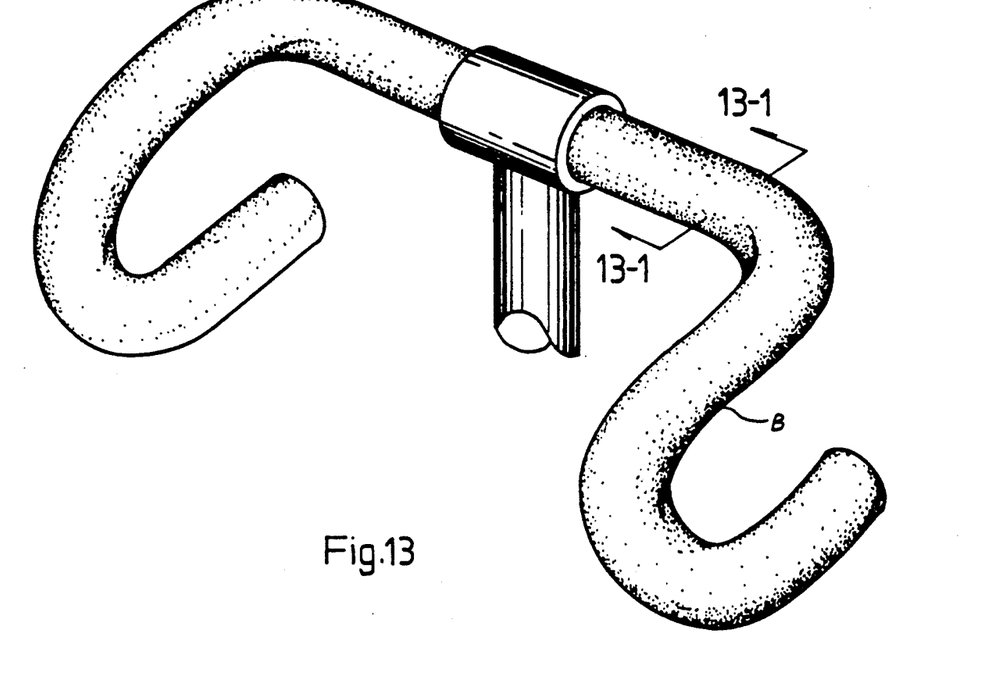
FIG. 13 is a perspective view of an air cushion grip in the present invention practically applied to a bicycle handle.
Figure 14:
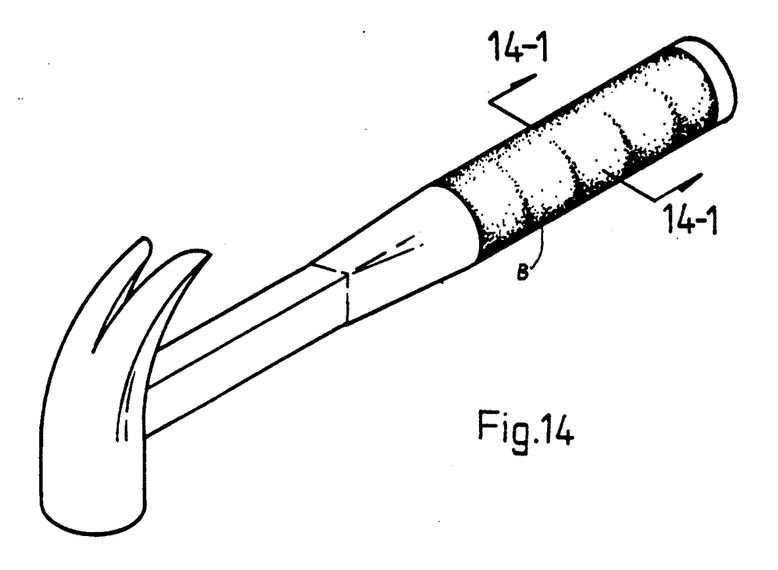
FIG. 14 is a perspective view of an air cushion grip in the present invention practically applied to a hammer.
Figure 15:
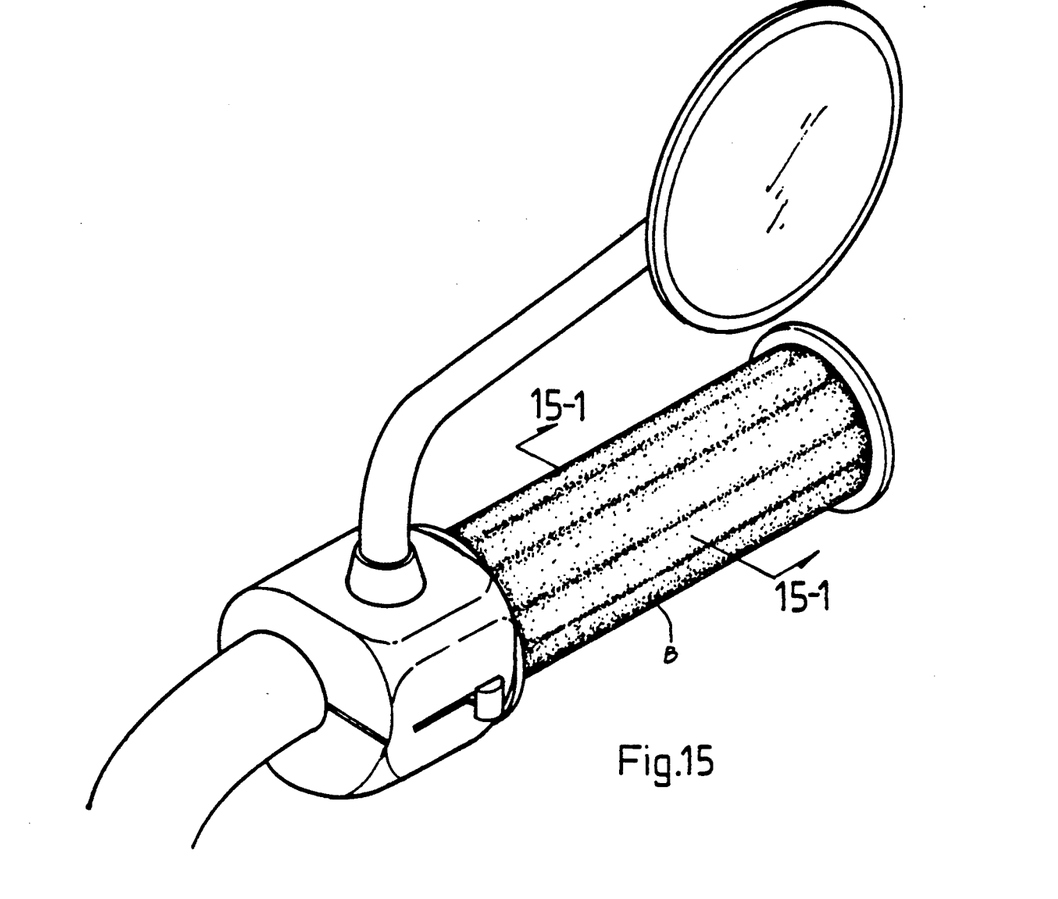
FIG. 15 is a perspective view of an air cushion grip in the present invention practically applied to a motorcycle handle.
Figure 16:
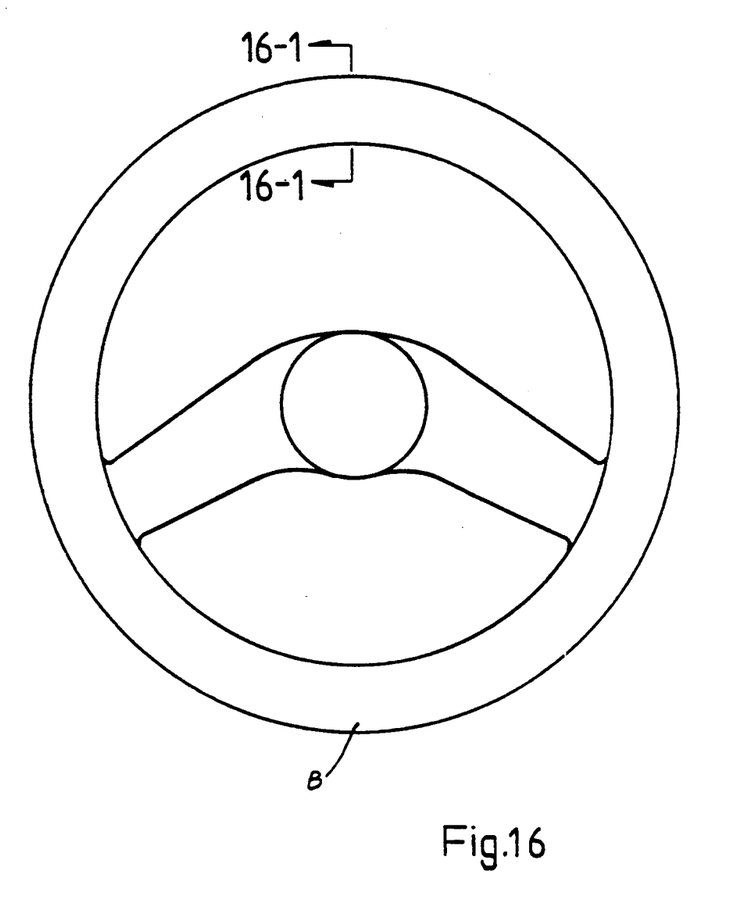
FIG. 16 is a perspective view of an air cushion grip in the present invention practically applied to a steering wheel of a car.

The second embodiment of an air cushion grip is shown in FIG. 5, having an air cushion consisting of a plurality of partial air cushions 2, which comprises an outer flat layer and a bottom layer having a plurality of round grooves and/or straight long grooves 11 joining the bottom layer with the outer layer. The vertical walls of the straight grooves 11 form a plurality of air cells 12 that are either independent or communicate with one another. The partial air cushions 2 can be made to communicate with one another by means of passage tubes 121 so that the air cells 12 communicating with one another may become a group of air cells communicating with one another. A hollow tube 13 can be provided to extend out of an air cell 12 for connecting to a one-way valve to inflate said partial air cushion 2. If the partial air cushions 2 are independent, each cushion 2 can be provided with an inflating means.

The third embodiment of an air cushion grip is shown in FIGS. 8–12, having an air cushion 3 and a front flake 15 and/or heel 16 connected and communicating with the air cushion 3, which is the same as cushions 1, 2 in the first and second embodiments.

FIGS. 13–16 show the air cushion grips in the present invention in practical use and applied to a bicycle handle, a hammer, a motorcycle handle and a steering wheel of a car. They have wide applications and are, not limited to one object only.

The method of connecting the right edge with the left edge of the air cushion 1, 2 or 3 in forming it into a cylindrical grip can be accomplished by gluing or by button holes 141 and buttons 142 fitting in the button holes 141 and then fused together with heat.

Air cushions for grips according to the invention may also have an outer flat layer and a bottom layer that is not flat but having a plurality of grooves and air cells that are either independent or communicate with one another and of different heights so that they can conform to any shape handle of a racket, a tool, etc.

If an air cushion is needed to be applied on a multigonal object, more than a square, with a corner line(s), protruding lines 17 are formed on the outer surface of the outer layer at positions corresponding to the corner lines of the object. Then the corner lines would be very sharp after the air cushion grip is fixed around the object. The protruding lines 17 can be square, triangular, semi-circular, etc.

Figure 18:
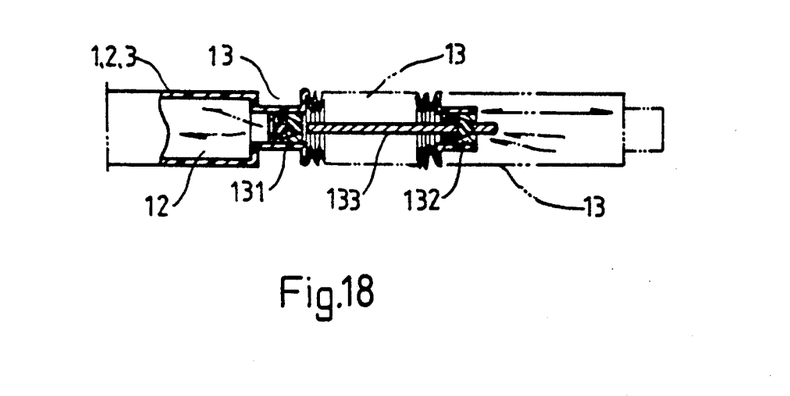
FIG. 18 is a cross-sectional view of another compressible air pump to be connected with an air cushion grip in the present invention.

An air cushion grip in the present invention can be made as a completely sealed air cushion grip without any inflating valves, having a certain definite interior pressure. It can also be attached with a manual compressible pump as shown in FIG. 18, which consists of a bellows-like flexible hollow tube 13 connected with a plurality of communicating air cells 12, a one-way outlet valve 131 betwen the air cell 12 and the inner end of said tube 13 and a one-way inlet valve 132 at the outer end of the tube 13. Then the tube 13 can be compressed or released to inflate air into the air cushion through the valves 131, 132. In addition, a pressure releasing rod 133 can be added to extend inward through the inlet valve 132 to outlet valve 131 and deflate the air from the air cushion.

Figure 17:
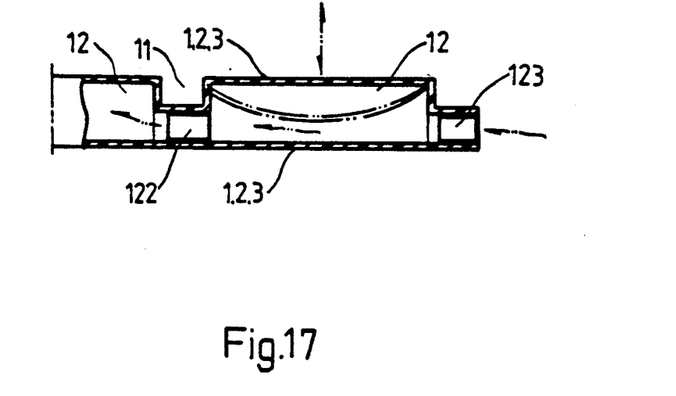
FIG. 17 is a cross-sectional view of a compressible air pump to be connected with an air cushion grip in the present invention.

FIG. 17 shows an outlet valve 122 attached between an outermost air cell 12 and an inner air cell 12 communicating with the other air cells 12. An inlet valve 123 can be attached to the outermost air cell 12 and compressed repeatedly to such the outside air into the inlet valve 123 and through the outlet valve 122 and into the air cushion.

A hollow tube 13 leading to the outside air can be attached to an outermost air cell 12 communicating with other air cells 12 in an air cushion grip, as shown in FIGS. 13–16 applied to a racket, a tool, a handle of a bicycle or a motorcycle, or steering wheel of a car. Then a pressure adjusting or releasing valve can be connected with the tube 13.

Figure 19:
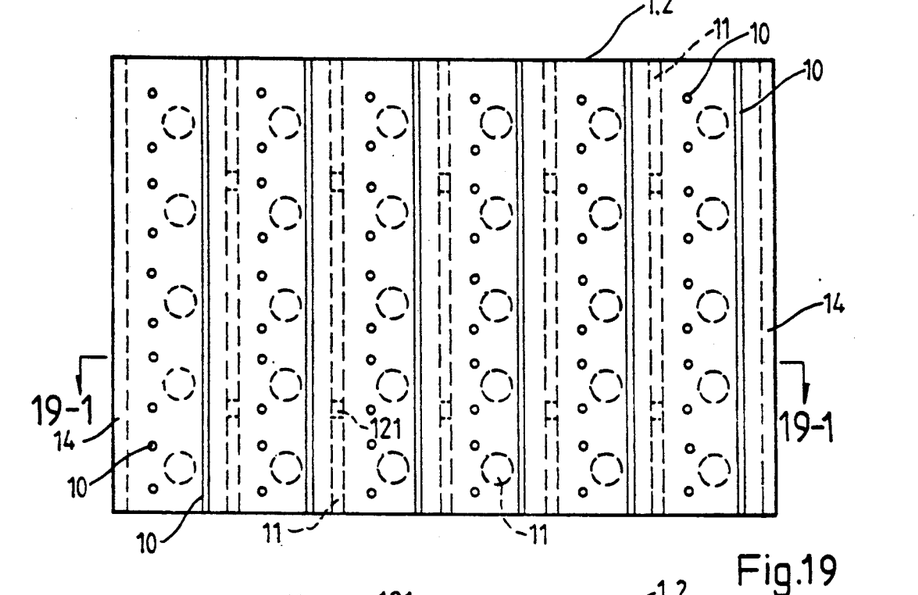
FIG. 19 is an elevational view of the fourth embodiment of an air cushion grip in the present invention.
Figure 191:
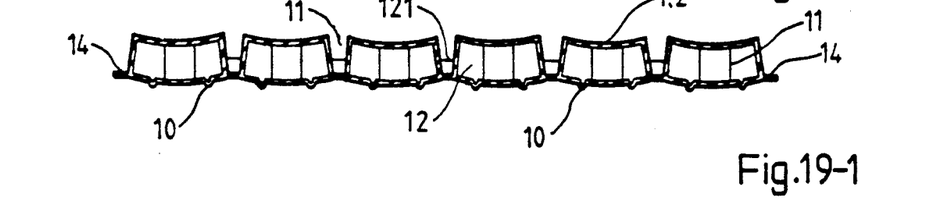
Figure 192:
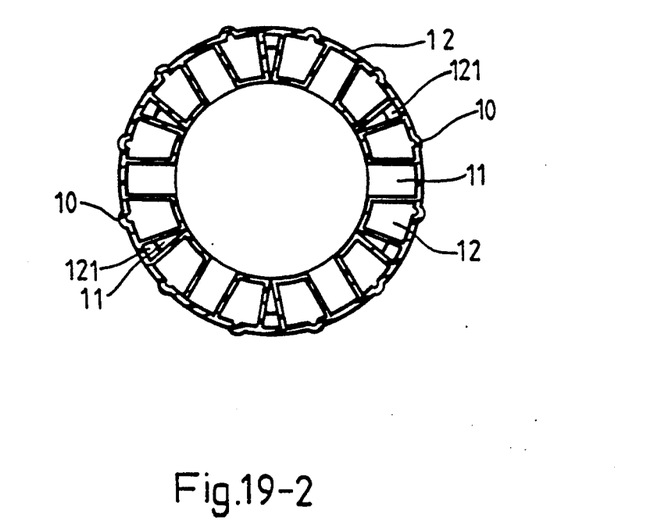
Figure 201:
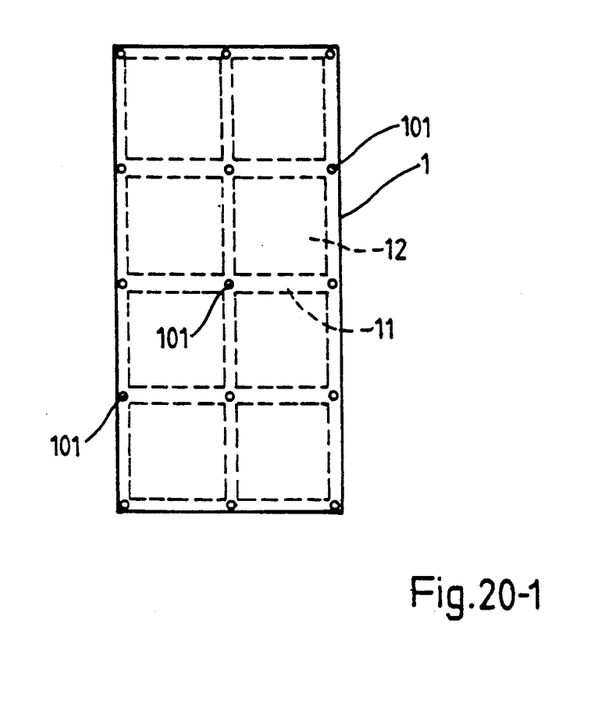
Figure 211:
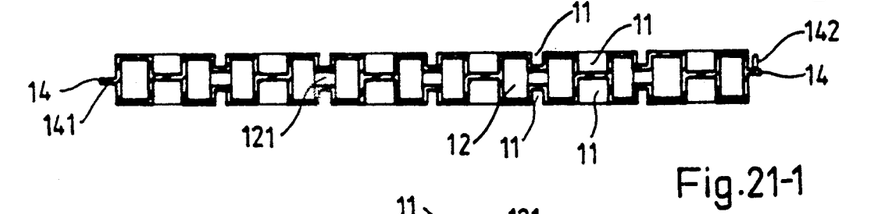
Figure 212:
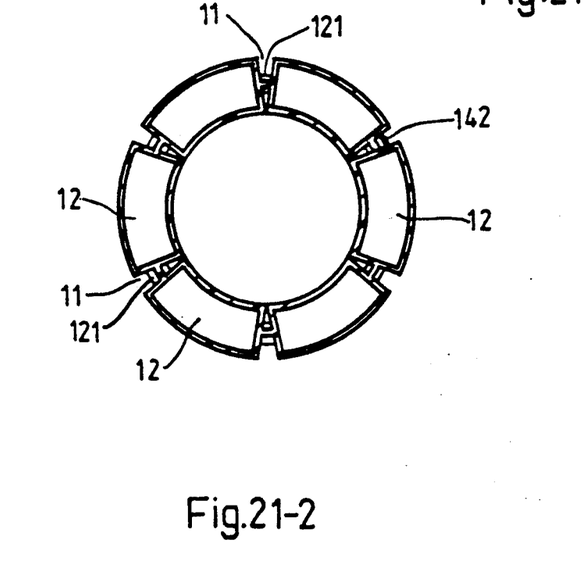

FIGS. 19, 19-1, 19-2 show an air cushion grip having an outer flat layer provided with a plurality of projecting points or lines 10 which provides grip friction, thus preventing a hand holding the grip from sliding off.

Figure 21:
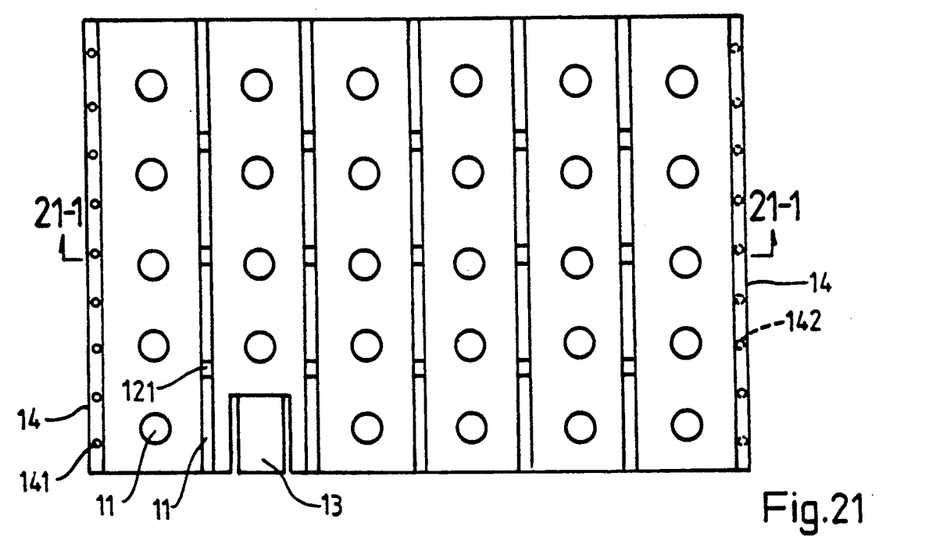
FIG. 21 is an elevational view of the sixth embodiment of an air cushion grip in the present invention.
Figure 41:
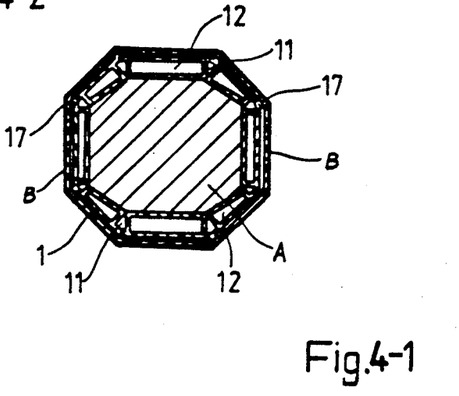
Figure 131:
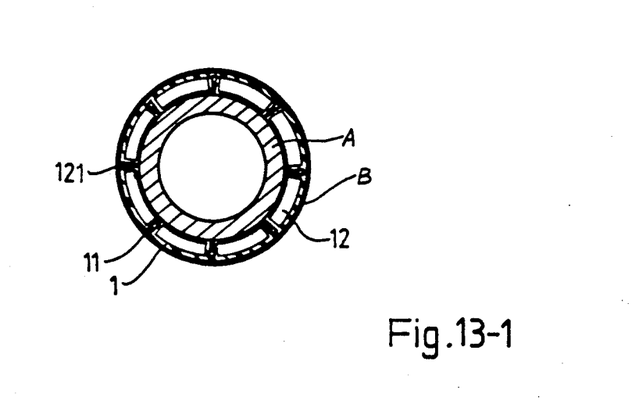
Figure 141:
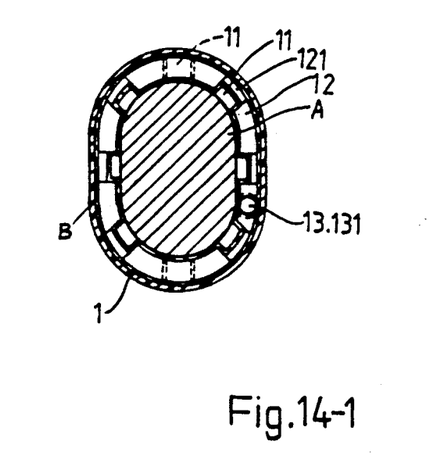
Figure 151:
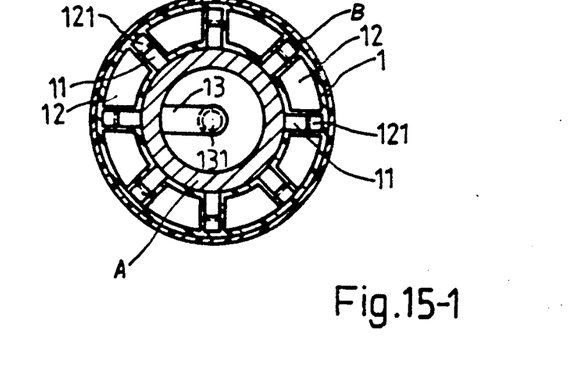
Figure 161:
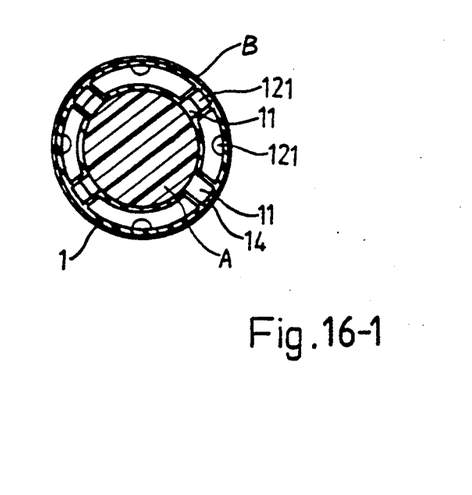

FIGS. 21, 21-1, 21-2 show an air cushion grip having an outer layer provided with a plurality of round and/or straight grooves 11, just like the bottom layer, so that each straight groove 11 in the outer layer has the bottom fused with each straight groove 11 in the bottom layer. This structure can provide grip friction and prevent a hand from sliding off by air circulation through the grooves 11. As is apparent from the foregoing descriptions, the cushion grip of the invention includes cubic air cells defined by intersecting planes forming desired cross-sectional configurations which permit the air cushion to be wrapped around a handle of a given configuration so that the inner surfaces of the cells engage and conform to the configuration of the handle. This produces a uniform and overlapping engagement between the inner surfaces of the air cells and the corresponding surfaces of the handle so that the outer surfaces of the cushion form a grip having the exact configuration as that of the original handle. This is well exemplified in FIGS. 4–1 through 4–3, FIGS. 13 and 13–1, FIGS. 14 and 14–1, FIGS. 15 and 15–1, and FIGS. 16 and 16–1.

Fixing methods of the air cushion grip on a handle of an object is described as follows.

1. It is placed around a handle of an object, for example, a racket, properly positioned between a flake and a heel, and then an outer eveloping layer B is bound thereon as shown in FIG. 4.

Figure 20:
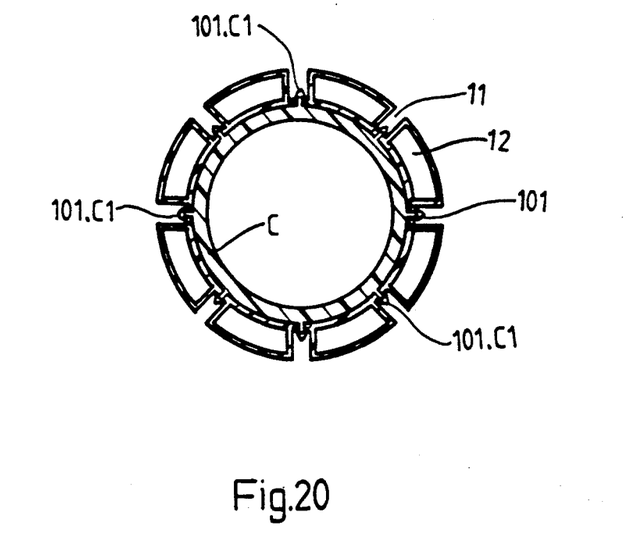
FIG. 20 is a cross-sectional view of the fifth, embodiment of an air cushion grip applied on a handle of an object.

2. A handle of a tool shown in FIG. 20 is first fixed with a base sheet C provided with a number of fastening buttons C1, and then an air cushion grip is placed in a shallow recess in the base sheet C, being adjusted to position button holes 101 provided in the round or straight grooves 11 in alignment for insertion by the fastening buttons C1, and thus the air cushion grip is held firmly on the handle of the tool. Then the air cushion grip is kept exposed, making it convenient for replacing an old one by a new one if the air cushion grip should be damaged. The base sheet C may also be made from elastic material having a shock-absorbing effect, not provided with fastening buttons C1 but with a recessed cavity for receiving the air cushion grip.

The outer enveloping layer B can be either a narrow slip of leather, cloth, foam etc, wound to partially or wholly cover the air cushion grip, or a foam to be directly enveloped around the air cushion grip. The air cushion grip can also be applied inside out, with the original outer flat layer serving as the bottom layer and the original bottom layer as the outer layer to expose the grooves.

What is claimed is:

1. A cushion grip for attachment to a handle to absorb shock comprising:
    a) at least one fluid cushion molded from flexible material and including a pair of opposed edges, means for joining the edges together for securing the cushion around the handle and a plurality of interconnected cubic fluid cells;
    b) the fluid cells being partially defined by a plurality of first surfaces which collectively form a substantially flat and smooth outer surface of the cushion when the cushion is disposed in a planer configuration, a plurality of side walls and a plurality of second surfaces;
    c) the side walls and second surfaces collectively form a substantially three-dimensional inner surface of the cushion, with the side walls being spaced to define a plurality of grooves extending between adjacent fluid cells; and
    d) the second surfaces defining planes which correspond in angular orientation to exterior surface portions of the handle when the cushion grip is secured in engagement with the handle, so that the outer surface of the grip forms substantially the same cross-sectional configuration as that of the handle.

2. The cushion grip of claim 1 wherein the fluid cells each have a predetermined internal pressure and are not in fluid communication with each other.

3. The cushion grip of claim 1 wherein the cross sectional configuration is substantially polygonal.

4. The cushion grip of claim 1 wherein the outer and inner surfaces form different cross-sectional configurations when the grip is secured around the handle.

5. The cushion grip of claim 1 wherein the outer surface further includes a plurality of grooves corresponding in position to the grooves of the inner surface.

6. A cushion grip for attachment to a handle to absorb shock comprising:
    a) at least one fluid cushion molded from flexible material and including a plurality of interconnected cubic fluid cells;
    b) means providing fluid communication between the fluid cells and valve means for increasing or decreasing fluid pressure in the fluid cells;
    c) the fluid cells being partially defined by a plurality of first surfaces which collectively form a substantially flat and smooth outer surface of the cushion when the cushion is disposed in a planer configuration, a plurality of side walls and a plurality of second surfaces;
    d) the side walls and second surfaces collectively form a substantially three-dimensional inner surface of the cushion, with the side walls being spaced to define a plurality of grooves extending between adjacent fluid cells; and
    e) the second surfaces defining planes which correspond in angular orientation to exterior surface portions of the handle when the cushion grip is secured in engagement with the handle, so that the outer surface of the grip forms substantially the same cross-sectional configuration as that of the handle.

7. A cushion grip for attachment to a handle to absorb shock comprising:
    a) at least one fluid cushion molded from flexible material and including a plurality of interconnected cubic fluid cells;
    b) the fluid cells being partially defined by a plurality of first surfaces which collectively form a flat and smooth outer surface of the cushion when the cushion is disposed in a planer configuration, a plurality of side walls and a plurality of second surfaces;
    c) the side walls and second surfaces collectively form a substantially three-dimensional inner surface of the cushion, with the side walls being spaced to define a plurality of grooves extending between adjacent fluid cells; and
    d) the second surfaces defining planes which include parallel, sloped-down and sloped-up angular orientations with respect to the first surfaces and which correspond in angular orientation to exterior surface positions of the handle when the cushion grip is secured in engagement with the handle, so that the outer surface of the grip forms substantially the same cross-sectional configuration as that of the handle.

8. A cushion grip for attachment to a handle to absorb shock comprising:
    a) at least one fluid cushion molded from flexible material and including a plurality of interconnected cubic fluid cells;

b) a fluid inlet valve, a fluid vent valve and a compressible pump for inflating and deflating the fluid cells;

c) the fluid cells being partially defined by a plurality of first surfaces which collectively form a substantially flat and smooth outer surface of the cushion when the cushion is disposed in a planer configuration, a plurality of side walls and a plurality of second surfaces;

d) the side walls and second surfaces collectively form a substantially three-dimensional inner surface of the cushion, with the side walls being spaced to define a plurality of grooves extending between adjacent fluid cells; and e) the second surfaces defining planes which correspond in angular orientation to exterior surface portions of the handle when the cushion grip is secured in engagement with the handle, so that the outer surface of the grip forms substantially the same cross-sectional configuration as that of the handle.

9. The cushion grip of claim 8 further including a release rod for actuating the fluid vent valve.

10. A cushion grip for attachment to a handle to absorb shock comprising:
a) at least one fluid cushion molded from flexible material and including a plurality of interconnected cubic fluid cells;
b) the fluid cells being partially defined by a plurality of first surfaces which collectively form a substantially flat and smooth outer surface of the cushion when the cushion is disposed in a planer configuration, a plurality of side walls and a plurality of second surfaces;
c) a plurality of protruding corner lines extending along the outer surface for conforming to corresponding positions at corners of the handle;
d) the side walls and second surfaces collectively form a substantially three-dimensional inner surface of the cushion, with the side walls being spaced to define a plurality of grooves extending between adjacent fluid cells; and
e) the second surfaces defining planes which correspond in angular orientation to exterior surface portions of the handle when the cushion grip is secured in engagement with the handle, so that the outer surface of the grip forms substantially the same cross-sectional configuration as that of the handle.

11. The cushion grip of claim 1 wherein the pair of opposed edges includes first and second side edges, and the means for joining the side edges together to secure the cushion around the handle includes a plurality of buttons carried along the first side edge and a plurality of buttonholes formed along the second side edge.

12. A cushion grip for attachment to a handle having a circular cross-sectional configuration to absorb shock comprising:
a) at least one fluid cushion molded from flexible material and including a pair of opposed edges, means for joining the edges together to secure the cushion around the handle and a plurality of interconnected cubic fluid cells;
b) the fluid cells being partially defined by a plurality of first surfaces which collectively form a substantially flat and smooth outer surface of the cushion when the cushion is disposed in a planer configuration, a plurality of side walls and a plurality of second surfaces;
c) the side walls and second surfaces collectively form a substantially three-dimensional inner surface of the cushion, with the side walls being spaced to define a plurality of grooves extending between adjacent fluid cells; and
d) the second surfaces collectively corresponding in configuration to the exterior surface configuration of the handle when the cushion grip is secured in engagement with the handle, so that the outer surface of the grip forms a substantially circular cross-sectional configuration corresponding to that of the handle.

13. A cushion grip for attachment to a handle having an oval cross-sectional configuration to absorb shock comprising:
a) at least one fluid cushion molded from flexible material and including a plurality of interconnected cubic fluid cells;
b) the fluid cells being partially defined by a plurality of first surfaces which collectively form a substantially flat and smooth outer surface of the cushion when the cushion is disposed in a planer configuration, a plurality of side walls and a plurality of second surfaces;
c) the side walls and second surfaces collectively form a substantially three-dimensional inner surface of the cushion, with the side walls being spaced to define a plurality of grooves extending between adjacent fluid cells; and
d) the second surfaces collectively corresponding in configuration to the exterior surface configuration of the handle when the cushion grip is secured in engagement with the handle, so that the outer surface of the grip forms a substantially oval cross-sectional configuration corresponding to that of the handle.

14. A cushion grip for attachment to a handle to absorb shock comprising:
a) at least one fluid cushion molded from flexible material and including a plurality of interconnected cubic fluid cells;
b) the fluid cells being partially defined by a plurality of first surfaces which collectively form a substantially flat and smooth outer surface of the cushion when the cushion is disposed in a planer configuration, a plurality of side walls and a plurality of second surfaces;
c) the side walls and second surfaces collectively form a substantially three-dimensional inner surface of the cushion, with the side walls being spaced to define a plurality of grooves extending between adjacent fluid cells; and
d) the second surfaces defining planes which correspond in angular orientation to the exterior surface portions of the handle when the cushion grip is secured in engagement with the handle, so that the both the inner and outer surfaces of the grip form substantially the same cross-sectional configuration as that of the handle.

15. A cushion grip for attachment to a racket handle to absorb shock comprising:
a) at least one fluid cushion molded from flexible material and including a plurality of interconnected cubic fluid cells, with portions of the fluid cells being configured to form a front flake and a heel for a racket handle;

b) the fluid cells being partially defined by a plurality of first surfaces which collectively form a substantially flat and smooth outer surface of the cushion when the cushion is disposed in a planer configuration, a plurality of side walls and a plurality of second surfaces;

c) the side walls and second surfaces collectively form a substantially three-dimensional inner surface of the cushion, with the side walls being spaced to define a plurality of grooves extending between adjacent fluid cells; and d) the second surfaces defining planes which correspond in angular orientation to the exterior surface portions of the handle when the cushion grip is secured in engagement with the handle, so that the outer surface of the grip forms substantially the same cross-sectional configuration as that of the handle.

16. A cushion grip for attachment to a handle to absorb shock comprising:

a) at least one fluid cushion molded from flexible material and including a plurality of interconnected cubic fluid cells;

b) the fluid cells being partially defined by a plurality of first surfaces which collectively form a substantially flat and smooth outer surface of the cushion when the cushion is disposed in a planer configuration, a plurality of side walls and a plurality of second surfaces;

c) the side walls and second surfaces collectively form a substantially three-dimensional inner surface of the cushion, with the side walls being spaced to define a plurality of grooves extending between adjacent fluid cells;

d) the second surfaces defining planes which correspond in angular orientation to the exterior surface portions of the handle when the cushion grip is secured in engagement with the handle, so that the outer surface of the grip forms substantially the same cross-sectional configuration as that of the handle; and e) a base sheet for attachment between the fluid cushion and the exterior surface of the handle and cooperating fastening means carried by the base sheet and the fluid cushion for securing the cushion grip to the base sheet.

17. A cushion grip for attachment to a handle to absorb shock comprising:

a) at least one fluid cushion molded from flexible material and including a plurality of interconnected cubic fluid cells;

b) the fluid cells being partially defined by a plurality of first surfaces which collectively form a substantially flat and smooth outer surface of the cushion when the cushion is disposed in a planar configuration, a plurality of side walls and a plurality of second surfaces;

c) the side walls and second surfaces collectively form a substantially three-dimensional inner surface of the cushion, with the side walls being spaced to define a plurality of grooves extending between adjacent fluid cells;

d) the second surfaces defining planes which correspond in angular orientation to the exterior surface portions of the handle when the cushion grip is secured in engagement with the handle, so that the outer surface of the grip forms substantially the same cross-sectional configuration as that of the handle; and e) an outer layer in the configuration of an elongate slip for enveloping the cushion grip after the latter has been secured around the handle.

18. The cushion grip of claim 17 wherein the outer layer is formed of foam material.

19. The cushion grip of claim 17 further including a double-sided adhesive tape for securing the outer layer to the cushion grip.

* * * * *